US008561594B2

(12) United States Patent
Oura et al.

(10) Patent No.: US 8,561,594 B2
(45) Date of Patent: Oct. 22, 2013

(54) INTERNAL COMBUSTION ENGINE CONTROLLER

(75) Inventors: Ryoichi Oura, Tokyo (JP); Mitsuhiko Watanabe, Tokyo (JP); Takuya Mayuzumi, Hitachinaka (JP); Masahiro Toyohara, Hitachinaka (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 762 days.

(21) Appl. No.: 12/832,814

(22) Filed: Jul. 8, 2010

(65) Prior Publication Data

US 2011/0023835 A1 Feb. 3, 2011

(30) Foreign Application Priority Data

Aug. 3, 2009 (JP) ................................. 2009-180673

(51) Int. Cl.
*F02D 41/22* (2006.01)
*F02D 13/02* (2006.01)
*F02D 41/30* (2006.01)

(52) U.S. Cl.
USPC ............................ 123/480; 361/139; 701/115

(58) Field of Classification Search
USPC .......... 123/480, 486, 487; 361/139, 146, 152; 701/97, 102, 114, 115
See application file for complete search history.

(56) References Cited

U.S. PATENT DOCUMENTS 5,125,471 A * 6/1992 Iwaoka et al. .................. 701/97
8,144,447 B2 * 3/2012 Oura et al. .................... 361/143

FOREIGN PATENT DOCUMENTS

| EP | 1329619 A1 * | 7/2003 |
| JP | 4-43436 A | 2/1992 |
| JP | 2003-74401 A | 3/2003 |

* cited by examiner

*Primary Examiner* — Hieu T Vo
(74) *Attorney, Agent, or Firm* — Crowell & Moring LLP (57) ABSTRACT

In an internal combustion engine controller, a clock trouble determination signal from a clock trouble determining circuit that diagnoses any clock input trouble is transmitted in parallel with an abnormality diagnosis signal outputted from an abnormality diagnosing circuit and causes it to be inputted to a trouble/abnormality signal output circuit, and the trouble/abnormality signal output circuit achieves logical summing to output one line of resultant trouble/abnormality output OR signals to a microprocessor (MP). The MP outputs to the trouble/abnormality signal output circuit a trouble/abnormality confirmation input signal, and makes definite any of an abnormal state, a clock trouble state and a normal state based on the result of switching control of the status level of the pertinent trouble/abnormality output OR signal.

11 Claims, 8 Drawing Sheets

INTERNAL COMBUSTION ENGINE CONTROLLER

BACKGROUND OF THE INVENTION (1) Field of the Invention

The present invention relates to an internal combustion engine controller to be mounted on an automobile, motorcycle, agricultural machine, industrial machine, ship machine or the like to control an electromagnetic load for driving a fuel injection device with a battery voltage as it is or at a boosted level, and more particularly to an internal combustion engine controller having a function to diagnose any trouble in a communication circuit or an oscillator circuit.

(2) Description of the Related Art

Known internal combustion engine controllers of this kind include a type equipped with an injector that directly injects gasoline into cylinders for the purpose of enhancing fuel efficiency or power output. Such the injector consumes much more energy than the action to open the injector valve on account of the use of highly pressurized fuel. Latest such injectors are more susceptible to trouble with an electromagnetic load or driver circuit element as they tend to involve an increase in the electric current flowing to an electromagnetic load (inductance load). This entails the need for more elaborate trouble diagnosis and higher precision.

In view of this problem, an internal combustion engine controller that controls electromagnetic loads such as this injector is usually provided with a voltage booster for obtaining a higher voltage than the voltage direct from the power source battery, and the voltage raised by this booster is applied to electromagnetic loads to increase in a short period of time the amperage of electricity supplied to the electromagnetic loads.

More specifically, in the electric current waveform of a typical injector that directly injects fuel into cylinders, the current fed to electromagnetic loads is raised with a boost voltage to a predetermined peak current stop level in a short period of time during the peak current supply period in the early stage of electricity supply. Next, to open the valve of the injector, the current supplied to electromagnetic loads should be maintained with a voltage direct from the power source battery, which is lower than the boost voltage. To keep this current supply to electromagnetic loads at a prescribed amperage, a high side driver connected to the electromagnetic loads is switched with a dedicated high side driver drive signal. Further at the end of injection, the duration of the descent of the current supplied to electromagnetic loads is shortened and the current supply to the electromagnetic loads is intercepted to quicken the closing of the injector valve.

The following is a description of clock trouble in such an internal combustion engine controller. In an internal combustion engine controller, which requires high-precision clock input signals for use in its internal circuits, generates with an internal oscillator circuit (including a known oscillator) clock input signals for driving internal circuits. In particular, the logic circuits and driving circuits of internal circuits operate according to the fall or rise edge of clock input signals that is detected.

However, there is a risk of clock input trouble, that is the failure of clock input signals from such an internal oscillator circuit to be normally inputted on account of disconnection of wiring, battery voltage short or ground short of input signals, trouble with oscillator, faulty mounting of components arising from a solder ball problem or any like cause.

In the event of such a clock input trouble resulting in the fixation of the clock input signals in a high or low state, the output signals of the logic circuits and driving circuits of internal circuits will be fixed in the high or low state. As the outputs of driving circuits for electromagnetic loads and of voltage boosting driving circuits (DC/DC converter driving circuits) are also fixed in the high or low state under the impact of this trouble, a continuous flow of high currents to electromagnetic loads will occur. If, for instance, the outputs of driving circuits for electromagnetic loads are fixed in an active state, the electromagnetic loads may be placed in an open-valve state, inviting a state of indefinite continuation of fuel injection. Or if the outputs of voltage boosting driving circuits (DC/DC converter driving circuits) are fixed in an active state, the current will continue to flow to the driving circuits themselves, involving a risk of ignition of the internal combustion engine controller.

To address this problem, today there is extensive use of configurations equipped with a communication circuit as a logic circuit of internal circuits to provide a function to communicate (output) the findings of trouble diagnosis regarding electromagnetic loads to a microprocessor disposed in the internal combustion engine controller. Usually such a communication circuit gives outputs in a mutually connected serial interface. Some of the known internal combustion engine controllers have a trouble diagnosing function for external circuit groups including driving circuits. The trouble diagnosing function of an already developed product monitors signals generated by a trouble detection circuit in the internal combustion engine controller and transmits data on the findings of trouble diagnosis to a microprocessor by serial interface.

Note will be made hereupon of a product, as a typical known internal combustion engine controller, which is provided with a function to transmit at regular intervals of time information on any faulty channel and the state of the fault in external circuits to a microprocessor by using serial interface mutually connecting the microprocessor and a serial interface circuit. Where a large number of power switches are present, such a product transmits diagnostic findings by increasing the quantity of data to be sent by serial interface, but this involves the problem of increased software loads on the microprocessor. The reason for increasing the quantity of data to be sent by serial interface here is that, if the quantity of data to be sent were kept small, it would be impossible to transmit information on faulty ones among all the channels and the state of the fault in external circuits to the microprocessor as diagnostic findings, resulting in impossibility, when more than one fault have occurred at the same time in a trouble detecting device including power switches for controlling ignition and fuel injection, to send multiple sets of trouble diagnosis information to fully communicate the diagnostic findings.

In an attempt to solve this problem, internal combustion engine controllers capable of detecting even multiple troubles regarding electromagnetic loads (battery voltage short, ground short, short or open load) without increasing the quantity of data communicated have also been developed.

One example that can be cited here is an engine controller that has a serial interface circuit to transmit diagnostic findings to a microprocessor by serial interface, accomplishes the transmission of diagnostic findings in one round of communication with serial interface signals of a prescribed number of bits, provides the serial interface signals of the diagnostic finding output with a bit indicating the presence or absence of multiple troubles and determines whether or not there are multiple troubles (see Japanese Patent Application Laid-Open Publication No. 2003-074401).

This engine controller (internal combustion engine controller) accomplishes transmission of diagnostic findings in one round of communication with serial interface signals of a prescribed number of bits, permits determination of whether or not there are multiple troubles according to a bit indicating the presence or absence of multiple troubles provides in the serial interface signals of the diagnostic finding output and can thereby determine, without having to increase the quantity of data communicated, any multiple troubles that have occurred.

Other examples of related known art include a microprocessor-equipped device that can detect the stop of clocks supplied to the microprocessor with a simple circuit that can be made up of a small number of components and prevent serious trouble from arising (see Japanese Patent Application Laid-Open Publication No. H4-043436),

SUMMARY OF THE INVENTION

The typical known internal combustion engine controllers involve a problem that, if a clock input signal to be supplied to a driving circuit for driving an electromagnetic load, a driving circuit (DC/DC converter driving circuit) for voltage boosting or a driving circuits or logic circuit in an internal circuit such as a serial interface circuit runs into some kind of clock input trouble (disconnection or the like), transmission to the microprocessor is made impossible, preventing the transmission of multiple trouble findings from being accomplished.

Or even if the techniques disclosed in Japanese Patent Application Laid-Open Publication No. 2003-074401 or Japanese Patent Application Laid-Open Publication No. H4-043436 cited above are applied, there is a problem that the occurrence of clock input trouble in trouble diagnosis of a clock input signal to be supplied to a driving circuit for driving an electromagnetic load, such as an injector, would cause the serial interface circuit to be fixed in the high or low state, and accordingly multiple trouble findings cannot be transmitted to the microprocessor by known serial interface.

It is then conceivable, as a way to transmit information on different troubles to the microprocessor without fail, to so configure the package as to permit transmission of information on clock input trouble regarding clock input signals and information on serial interface input trouble regarding serial interface on different transmission lines, but such a configuration would enormously increase the load on the data processing function of the microprocessor and might invite consumption of a much longer time for data processing. Therefore, this technique cannot be considered desirable.

The present invention, attempted with a view to addressing these problems, is intended to provide an internal combustion engine controller that can normally transmit to the microprocessor, even if some kind of clock input trouble or other occurs to clock input signals, trouble/abnormality findings (including different kinds of trouble findings) and minimize the data processing load on the microprocessor over the minimum number of transmission lines.

In order to achieve the technical object stated above, an internal combustion engine controller according to the invention has an electromagnetic load controller disposed between a battery source voltage and a grounding voltage; an electromagnetic load driven by the electromagnetic load controller; a microprocessor for outputting a control signal for controlling the driving of the electromagnetic load by the electromagnetic load controller; a clock input signal generating circuit for generating a clock input signal for use in working the electromagnetic load controller; an abnormality diagnosing circuit for diagnosing any physical abnormality with respect to the electromagnetic load controller and the electromagnetic load; and a clock trouble diagnosing circuit for diagnosing any clock input trouble of the clock input signal outputted from the clock input signal generating circuit, further provided with a trouble/abnormality signal output circuit using a logic circuit to which an abnormality diagnosis signal outputted from the abnormality diagnosing circuit and a clock trouble diagnosis signal outputted from the clock trouble diagnosing circuit are inputted in parallel and which outputs one line of trouble/abnormality output signals resulting from the logical summing of the inputted signals, wherein the microprocessor, according to a variation in the status level of the trouble/abnormality output signals inputted from the trouble/abnormality signal output circuit, outputs a trouble/abnormality confirmation input signal to the pertinent trouble/abnormality signals output circuit, and makes definite any of an abnormal state, a clock trouble state and a normal state based on the result of switching control of the status level of the pertinent trouble/abnormality output signals.

In one mode of implementing the internal combustion engine controller, the abnormality diagnosing circuit is an over temperature diagnosing circuit which diagnoses over temperature, or an overcurrent diagnosing circuit which diagnoses overcurrent, as the physical abnormality.

The internal combustion engine controller in another mode of implementation is further provided with a communication circuit which communicates to and from the microprocessor trouble diagnosis information regarding the electromagnetic load or the value of a set variable regarding the electromagnetic load, wherein the abnormality diagnosing circuit is a communication trouble diagnosing circuit which diagnoses any communication trouble between the communication circuit and the microprocessor; the trouble/abnormality signal output circuit is a multi-type trouble output circuit to which a communication trouble diagnosis signal outputted from the communication trouble diagnosing circuit and the clock trouble diagnosis signal outputted from the clock trouble diagnosing circuit are inputted in parallel and which outputs one line of trouble output signals resulting from the logical summing of the inputted signals, and the microprocessor, according to a variation in the status level of the trouble output signals inputted from the multi-type trouble output circuit, outputs a trouble confirmation input signal to the pertinent multi-type trouble output circuit, and makes definite any of an abnormal state, a clock trouble state and a normal state based on the result of switching control of the status level of the pertinent trouble output signal.

In another mode of implementing the internal combustion engine controller, the communication trouble diagnosing circuit, if the number of bits of the communication input signal transmitted from the microprocessor to the communication circuit is not normal, outputs a diagnostic finding as the communication trouble to the pertinent microprocessor via the pertinent communication circuit. In this internal combustion engine controller, it is preferable for the communication trouble diagnosing circuit, when the communication trouble is made definite by the microprocessor, to switches over a set variable set in the communication circuit to the initial value thereof or for the clock trouble diagnosing circuit, when it diagnoses that the clock trouble has occurred in the clock input signal outputted from the clock input signal generating circuit, to output a reset control signal to reset the actions of the electromagnetic load controller and the communication circuit. Further in the latter internal combustion engine controller, it is preferable for the clock trouble diagnosing circuit, when it diagnoses that, after the actions of the electromagnetic load controller and the communication circuit have been reset by the outputting of the reset control signal, the clock trouble in the clock input signal has been eliminated and normalcy has returned, to automatically cancel the pertinent reset and to stop outputting the pertinent reset control signal, and for a reset restoration diagnosing circuit which inputs the reset control signal and diagnoses whether or not restoration from the reset has been achieved and, if restoration from the pertinent reset has been found achieved, outputs a reset restoration diagnosis signal to the communication circuit to restore the action of the pertinent communication circuit to be further provided.

In addition, in any of the internal combustion engine controllers described above, it is preferable for at least the electromagnetic load controller, the abnormality diagnosing circuit, the clock trouble diagnosing circuit, the communication trouble diagnosing circuit, the trouble/abnormality signal output circuit or the multi-type trouble output circuit, the communication circuit and the reset restoration diagnosing circuit to be configured as an integrated circuit.

Meanwhile, a computer-readable program for any of the internal combustion engine controllers according to the invention described above has functional information on the microprocessor, the abnormality diagnosing circuit, the clock trouble diagnosing circuit, the communication trouble diagnosing circuit, the trouble/abnormality signal output circuit or the multi-type trouble output circuit, the communication circuit, and the reset restoration diagnosing circuit or functional information on the integrated circuit in any of the internal combustion engine controllers described above, and is executable by a CPU.

On the other hand, functions regarding the microprocessor, the abnormality diagnosing circuit, the clock trouble diagnosing circuit, the communication trouble diagnosing circuit, the trouble/abnormality signal output circuit or the multi-type trouble output circuit, the communication circuit and the reset restoration diagnosing circuit or the functions of the integrated circuit in any of the internal combustion engine controllers according to the invention described above may be configured of an external circuit.

Any of the internal combustion engine controllers according to the invention can normally transmit to the microprocessor, even if some kind of clock input trouble or other occurs to clock input signals to be supplied to the driving circuits or logic circuits of internal circuits, trouble/abnormality findings (including different kinds of trouble findings) and minimize the data processing load on the microprocessor over the minimum number of transmission lines. As a result, the reliability and precision of diagnosis of electromagnetic load trouble can be ensured and trouble diagnosis of internal circuits can be accomplished securely, resulting in improved safety and reliability over existing comparable devices.

BRIEF DESCRIPTION OF THE DRAWINGS

Embodiments of the present invention will be described in detail based on the following figures, wherein.

DETAILED DESCRIPTION OF THE INVENTION

The internal combustion engine controller according to the invention will be described in detail below with reference to the accompanying drawings by citing a number of exemplary embodiments of the invention.

Exemplary Embodiment 1

Figure 1:
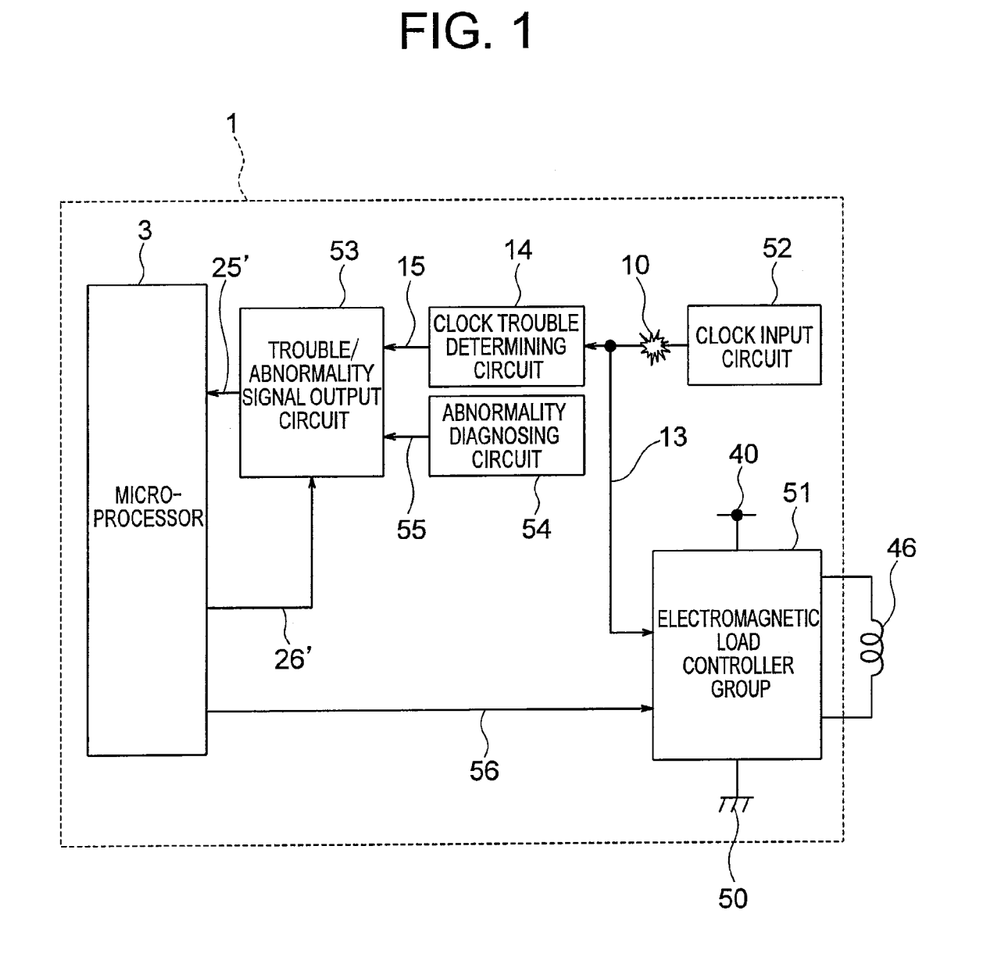
FIG. 1 is a block diagram showing a schematic configuration of an internal combustion engine controller, which is Exemplary Embodiment 1 of the present invention.

FIG. 1 is a block diagram showing a schematic configuration of an internal combustion engine controller 1 pertaining to Exemplary Embodiment 1 of the invention.

This internal combustion engine controller 1 has a functional configuration by which, when it drives an electromagnetic load controller group 51 by applying a battery source voltage 40 and drives an electromagnetic load 46 connected to this electromagnetic load controller group 51 to supply electricity, it controls the electromagnetic load controller group 51 with an electromagnetic load control signal 56 from a built-in microprocessor 3 and a clock input signal 13 generated by a clock input circuit 52.

In more specific terms, the internal combustion engine controller 1 is provided with the electromagnetic load controller group 51 disposed between the battery source voltage 40 and a grounding voltage (GND) 50; the electromagnetic load 46 driven by the electromagnetic load controller group 51; the microprocessor 3 that outputs an electromagnetic load control signal 56 for controlling driving of the electromagnetic load 46 by the electromagnetic load controller group 51; the clock input circuit 52 that serves as a clock input signal generating circuit to generate the clock input signal 13 to be used for working the electromagnetic load controller group 51; an abnormality diagnosing circuit 54 that diagnoses any physical abnormality regarding the electromagnetic load controller group 51 and the electromagnetic load 46; a clock trouble determining circuit 14 that serves as a clock trouble diagnosing circuit to diagnose any clock input trouble 10 of the clock input signal 13 outputted from the clock input circuit 52, and a trouble/abnormality signal output circuit 53 using an OR circuit to which an abnormality diagnosis signal 55 outputted from the abnormality diagnosing circuit 54 and a clock trouble determination signal 15 outputted from the clock trouble determining circuit 14 are inputted in parallel and from which a line of trouble/abnormality output OR signals 25' having gone through logical summing are outputted.

It has to be noted, however, that the microprocessor 3 here outputs a trouble/abnormality confirmation input signal 26' to the trouble/abnormality signal output circuit 53 according to variations in the status level of the trouble/abnormality output OR signals 25' inputted from the trouble/abnormality signal output circuit 53, and makes definite any one of an abnormal state, a clock trouble state and a normal state based on the result of applying switching control of the status level of the trouble/abnormality output OR signal 25'.

Thus, this internal combustion engine controller 1 has one of its characteristic features in the procedure in which two kinds of diagnoses, one in which the clock input signal 13 generated by the clock input circuit 52 for working the electromagnetic load controller group 51 has run into a clock input trouble 10 by disconnection or some other cause and the other in which an abnormality different from this clock input trouble 10 has arisen, are detected by the microprocessor 3 with the one line of trouble/abnormality output OR signal 25'.

Figure 2:
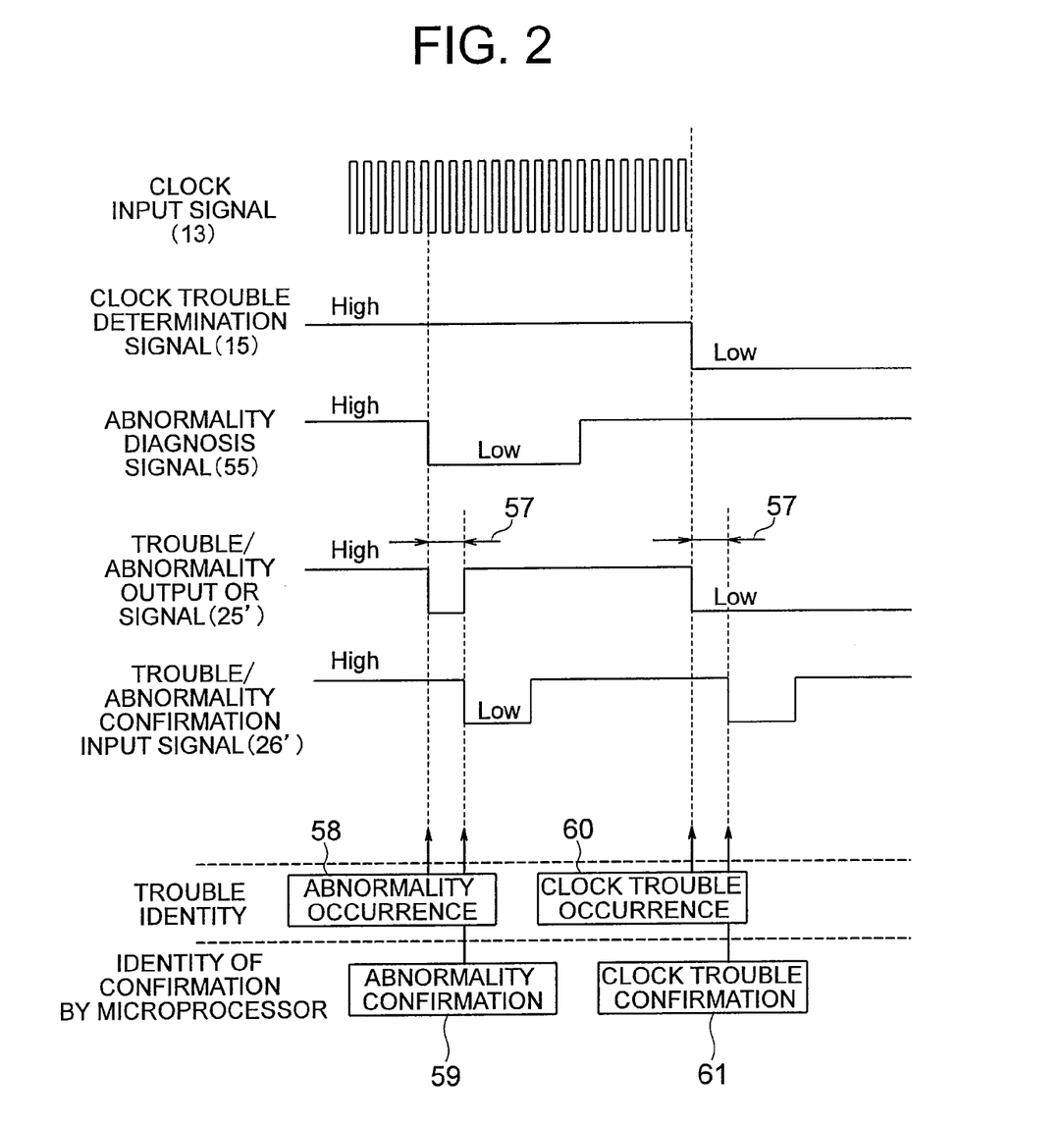
FIG. 2 is a timing chart of signal waveforms in different parts shown to illustrate processing by the internal combustion engine controller shown in FIG. 1.

FIG. 2 is a timing chart of signal waveforms in different parts shown to illustrate processing by this internal combustion engine controller 1.

Herein, in the event of the clock input trouble 10 that the clock input signal 13 generated by the clock input circuit 52 is prevented by some trouble or other from being supplied to the electromagnetic load controller group 51, the clock trouble determination signal 15 indicating detection of a clock stop by the clock trouble determining circuit 14 is changed from the high state to the low state and outputted to the trouble/abnormality signal output circuit 53.

On the other hand, the abnormality diagnosing circuit 54 which diagnoses a different type of trouble or abnormality from what is determined as the clock input trouble 10, when such an abnormality arises, changes the abnormality diagnosis signal 55 from the high state to the low state and outputs it to the trouble/abnormality signal output circuit 53.

Then, the trouble/abnormality signal output circuit 53 outputs to the microprocessor 3 the trouble/abnormality output OR signal 25' resulting from logical summing of the clock trouble determination signal 15 and the abnormality diagnosis signal 55 regarding two different kinds of trouble. The trouble/abnormality output OR signal 25' here is composed by an OR circuit, whose output is in the high state when all the inputs are in the high state, the low state when all the inputs are in the low state and the low state when any one of the inputs are in the low state.

More specifically, the trouble/abnormality output OR signal 25' has two switching modes: in one mode, it is switched from the high state to the low state in the period from the initial abnormality occurrence 58 until an abnormality confirmation 59 by the microprocessor 3 after a prescribed trouble/abnormality confirmation delay time 57 and in the other, it is switched from the high state to the low state in the period from a clock trouble occurrence 60 until a clock trouble confirmation 61 by the microprocessor 3 after the prescribed trouble/abnormality confirmation delay time 57.

Here, the microprocessor 3, when the trouble/abnormality output OR signal 25' has been switched from the high state to the low state, outputs a trouble/abnormality confirmation input signal 26' to the trouble/abnormality signal output circuit 53 according to the change in the status level of that trouble/abnormality output OR signal 25' and makes definite one of the abnormal state, the clock trouble state and the normal state based on the result of the switching control of the status level of that trouble/abnormality output OR signal 25'.

Occurrence of an abnormality first is supposed here, not a clock input trouble 10, and accordingly the clock trouble determination signal 15 is keeping the high state; therefore when the trouble/abnormality confirmation input signal 26' has been switched from the high state to the low state, the trouble/abnormality output OR signal 25' can be switched from the low state to the high state.

However, if the clock input trouble 10 occurs next and the clock input signal 13 is fixed in the low state (or in the high state as well), all the circuits of the electromagnetic load controller group 51 will stop operation and become unable to count the clocks, with the consequence that the trouble/abnormality output OR signal 25' cannot be switched from the low state to the high state. Thus, if the trouble/abnormality output OR signal 25' can be switched from the low state to the high state with the trouble/abnormality confirmation input signal 26', the microprocessor 3 can identify abnormality occurrence or, if not, will regard the trouble as the clock input trouble 10.

In this way, the microprocessor 3 can confirm in such a sequence the type of trouble (of course the normal state if no information on trouble is detected) with the trouble/abnormality confirmation input signal 26' based on one line of the trouble/abnormality output OR signals 25' obtained by logical summing two different trouble types including the clock input trouble 10.

As a result, when the clock input trouble 10 of the clock input signal 13 is confirmed in the internal combustion engine controller 1, if the microprocessor 3 resets current driving of the electromagnetic loads 46 by controlling the electromagnetic load controller group 51 with the electromagnetic load control signal 56, an automatic shift to a reset state is possible without relying on the output of a reset signal from the microprocessor 3, resulting in an advantage that secondary trouble such as heating or ignition of the internal combustion engine can be prevented from being induced. In such a configuration to reset current driving of the electromagnetic loads 46, even when the clock input signal 13 has been restored from the occurrence of the clock input trouble 10, the reset state can be automatically canceled without relying on the output of a reset cancellation signal from the microprocessor 3, and the data processing load on the microprocessor 3 can be alleviated.

Furthermore, this internal combustion engine controller 1 is equipped with a communication circuit for serial interface of trouble diagnosis information regarding the electromagnetic load 46 or the value of set variable regarding the electromagnetic load 46 to and from the microprocessor 3, and the abnormality diagnosing circuit 54 is configured as a communication trouble diagnosing circuit for diagnosing communication trouble between the communication circuit and the microprocessor 3. Therefore, as the minimum required control of the internal combustion engine can be continued even if some abnormality or other occurs on the transmission line of the communication circuit, set variables pertaining to the driving pattern of multiple power switches and fuel injection quantity among other factors can be switched to their respective initial values.

Moreover since the trouble/abnormality output OR signal 25' can be turned on or off irrespective of the state of the clock input signal 13 in this internal combustion engine controller 1, even if the clock input trouble 10 occurs to the clock input signal 13 to prevent its inputting, the trouble/abnormality output OR signal 25' indicating trouble or abnormality for any other reason can be transmitted to the microprocessor 3.

Incidentally, whereas an over temperature diagnosing circuit for diagnosis of over temperature as physical abnormality, an overcurrent diagnosing circuit for diagnosis of over current and the like can be applied to the abnormality diagnosing circuit besides the communication trouble diagnosing circuit equipped with the communication circuit, specific configurations of these circuits will be described in detail below in connection with other exemplary embodiments of the invention.

Exemplary Embodiment 2

Figure 3:
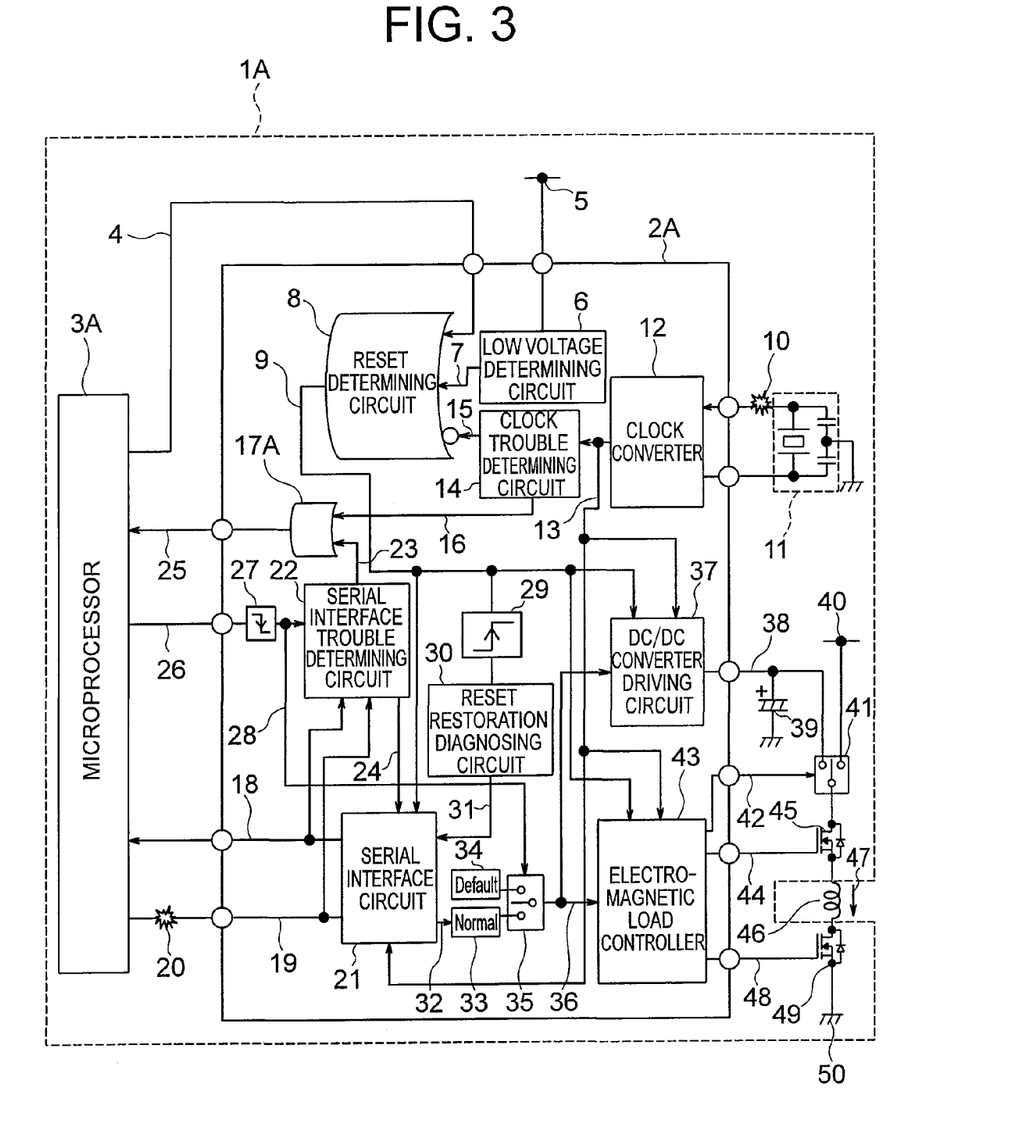
FIG. 3 is a circuit diagram illustrating the basic configuration of an internal combustion engine controller, which is Exemplary Embodiment 2 of the invention.

FIG. 3 is a circuit diagram illustrating the basic configuration of an internal combustion engine controller 1A, which is Exemplary Embodiment 2 of the invention.

This internal combustion engine controller 1A, intended for driving of an electromagnetic load (direct injector) 46, has a basic configuration including a microprocessor 3A; an integrated circuit 2A different parts of whose one end are connected to this microprocessor 3A, an oscillator circuit 11 which is an electrical line element to which different parts on the other end side of the integrated circuit 2A are connected and id formed by mutual grounding of a pair of capacitors connected in series to an oscillator element; the electromagnetic load 46 disposed between the battery source voltage 40 and the grounding voltage (GND) 50; a low side driver 49 disposed toward the grounding voltage (GND) 50 comprising switching elements including an FET for constituting a driver to control an electrifying current 47 to this electromagnetic load 46; a high side driver 45 disposed toward the battery source voltage 40; a power supply switching circuit 41 disposed between the battery source voltage 40 and the high side driver 45; and various including a capacitor 39 for a booster whose positive pole is connected to a connecting section to be switched back and forth to a connection point connected to the battery source voltage 40 in the power supply switching circuit 41. In this description, as viewed from the electromagnetic load 46, the side toward the battery source voltage 40 is referred to as the high side (upstream) and that toward the grounding voltage (GND) 50, the low side (downstream).

Out of these circuits, the power supply switching circuit 41 is provided to enable the power supply to the high side driver 45 to be switched to the battery source voltage 40 or a boosted source voltage 38 higher than the battery source voltage 40 by inputting an applied switching signal 42 from an electromagnetic load controller 43 in the integrated circuit 2A to be described afterwards. The boosted source voltage 38 is obtained by boosting by a DC/DC converter driving circuit 37 in the integrated circuit 2A and being charged to the capacitor 39 for the booster.

Further, the electromagnetic load controller 43 in the integrated circuit 2A, besides outputting a high side driver driving signal 44 for to the high side driver 45 and outputting a low side driver driving signal 48 to the low side driver 49, is enabled to alter parameters concerning the driving of the electromagnetic load 46 with the high side driver driving signal 44 and the low side driver driving signal 48 as a serial interface circuit 21 to which a serial interface input signal 19 from the microprocessor 3A has been inputted sends out a first set variable signal 32 to a set variable holding unit (Normal) 33 and inputs a second set variable signal 36 having selectively outputted with a set mode switching circuit 35 setting of a set variable whose setting can be altered by the set variable holding unit (Normal) 33 or setting of the set variable of a predetermined initial value with a set variable holding unit (Default) 34.

The DC/DC converter driving circuit 37, the electromagnetic load controller 43 and the serial interface circuit 21 in the integrated circuit 2A described above operate on the clock input signal 13 obtained by converting a clock input from the oscillator circuit 11 with a clock converter 12 within the integrated circuit 2A. Generally, the clock input signal 13 is obtained as a conversion output from the clock converter 12 into which a clock generated by a quartz oscillator or a ceramic oscillator, which is the oscillator of the oscillator circuit 11, has been inverted, and is supplied to each of the driving circuits.

Within the integrated circuit 2A, a reset signal 4 from the microprocessor 3A can be turned on or off, and every one of the driving circuits can be switched over to a reset state with a reset control signal 9 from a reset determining circuit 8 to which a low voltage detection signal 7 resulting from the determination of the variation level of a reference voltage 5 by a low voltage detection circuit 6 is inputted.

In addition, the integrated circuit 2A is provided in it with the clock trouble determining circuit 14 which outputs the clock trouble determination signal 15 having determined the clock input trouble 10 based on the clock input signal 13 from the clock converter 12 and a clock trouble signal 16 indicating clock trouble, a serial interface input signal 19 transmitted and received between the microprocessor 3A and the serial interface circuit 21, a serial interface trouble determination signal 24 having determined a serial interface input trouble 20 based on a serial interface output signal 18, a serial interface trouble determining circuit 22 which outputs a serial interface trouble signal 23 indicating serial interface trouble, an OR circuit 17A which receives inputting of the clock trouble signal 16 and the serial interface trouble signal 23 and outputs the trouble output OR signal 25 resulting from the logical summing of the inputs to the microprocessor 3A, a fall detecting circuit 27 which detects the fall of a trouble confirmation input signal 26 for the serial interface trouble determining circuit 22 from the microprocessor 3A and outputs a set variable switching signal 28 for the set mode switching circuit 35, the set variable holding unit (Default) 34 for a set variable of a predetermined initial value for the set mode switching circuit 35, a rise detecting circuit 29 which sends out to a reset restoration diagnosing circuit 30 the result of detecting the rise of the reset control signal 9 from the reset determining circuit 8, and the reset restoration diagnosing circuit 30 which outputs to the serial interface circuit 21 a reset restoration diagnosis signal 31 of diagnosis of reset restoration based on the result of detecting the rise of this rise detecting circuit 29.

Figure 4:
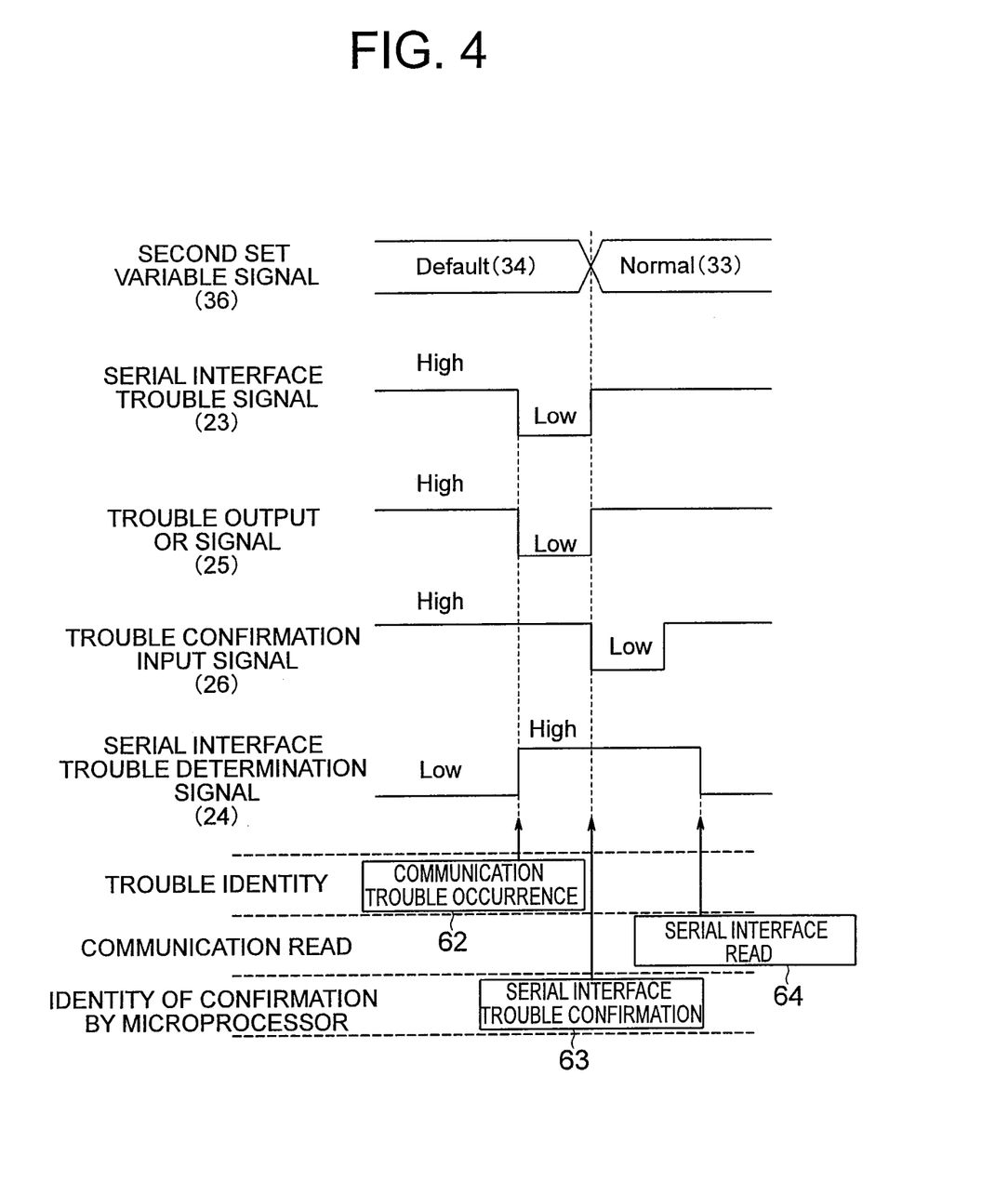
FIG. 4 is a timing chart of signal waveforms in different parts shown to illustrate processing in the event of serial interface input trouble in a serial interface circuit provided in the internal combustion engine controller shown in FIG. 3.

FIG. 4 is a timing chart of signal waveforms in different parts shown to illustrate processing in the event of the serial interface input trouble 20 occurring in the serial interface circuit 21 provided in the internal combustion engine controller 1A.

Serial communication in this internal combustion engine controller 1A is accomplished by the exchange of the serial interface input signal 19 from the microprocessor 3A and the serial interface output signal 18 from the serial interface circuit 21.

For instance, if disconnection occurs in the serial interface input signal 19 to invite the serial interface input trouble 20 and a communication trouble occurrence 62 arises in which the serial interface input signal 19 fails to be transmitted to the serial interface circuit 21, set variable that can be altered by the set variable holding unit 33 in the initial state for the second set variable signal 36 inputted to the electric load driving circuit 43 is selectively set by the set mode switching circuit 35, and the serial interface trouble signal 23 indicating the result of confirmation of the serial interface input trouble 20 by the serial interface trouble determining circuit 22 based on the serial interface input signal 19 and the serial interface output signal 18 transmitted and received between the microprocessor 3A and the serial interface circuit 21 is switched from the high state to the low state and is outputted to the OR circuit 17A while the serial interface trouble determination signal 24 is outputted to the serial interface circuit 21.

The serial interface trouble signal 23 here is outputted via the OR circuit 17A to the microprocessor 3A as the trouble output OR signal 25. While the clock trouble signal 16 from the clock trouble determining circuit 14 is also inputted to the OR circuit 17A, since no clock input trouble 10 has occurred here, inputting of the clock trouble signal 16 in the high state to the OR circuit 17A causes the trouble output OR signal 25 to be kept initially in the high state.

When the trouble output OR signal 25 outputted from the OR circuit 17A to which the serial interface trouble signal 23 in the low state has been inputted is switched over from the high state to the low state, the microprocessor 3A switches over the trouble confirmation input signal 26 from the high state to the low state as a serial interface trouble confirmation 63 and causes the signal to be inputted to the serial interface trouble determining circuit 22.

In this way, in the serial interface trouble determining circuit 22, the microprocessor 3A can confirm the serial interface input trouble 20 as the trouble output OR signal 25 outputted from the OR circuit 17A is switched over from the low state to the high state as a result of the switching-over of the serial interface trouble signal 23 from the low state to the high state according to the set variable switching signal 28 generated at the timing of detection of the fall of the trouble confirmation input signal 26 by the fall detecting circuit 27. For the second set variable signal 36 inputted to the electric load driving circuit 43 by the set variable switching signal 28 at the same time as the switching-over of the serial interface trouble signal 23 from the low state to the high state, a set variable, preset by a set variable holding unit 34 in the set mode switching circuit 35, is selectively set.

Incidentally, when the serial interface input trouble 20 of the serial interface circuit 21 has occurred, at the same time the flag of the serial interface trouble determination signal 24 is switched over from the low state to the high state and inputted to the serial interface circuit 21, and this fact is made known to the microprocessor 3A by the serial interface output signal 18. This function, however, is considered useful when, for instance, the number of serial interface bits of the serial interface input signal 19 inputted from the microprocessor 3A to the serial interface circuit 21 is not normal, not when the serial interface input trouble 20 has resulted from disconnection or some other trouble on the line of the serial interface input signal 19. For example, in the state of a serial interface read 64 in which the flag of the serial interface trouble determination signal has been switched over from the high state to the low state, the abnormality of the number of serial interface bits is made known to the microprocessor 3A from the serial interface circuit 21 by the serial interface output signal 18.

In the case of this internal combustion engine controller 1A, the electromagnetic load controller 43 can alter the set variable set in the second set variable signal 36 by selectively setting, as described above, the set variable holding unit 33 having an alterable set variable with the set mode switching circuit 35 via the serial interface circuit 21 to which the serial interface input signal 19 from the microprocessor 3A. Further, in the case of this internal combustion engine controller 1A, when the serial interface input trouble 20 has arisen to cause the trouble confirmation input signal 26 to be switched over from the high state to the low state, even if the microprocessor 3A is unable to directly monitor the second set variable signal 36 inputted to the electromagnetic load controller 43 or the state of determination of the serial interface input trouble 20, it is possible to accomplish a change-over by causing the set mode switching circuit 35 to selectively set with the set variable switching signal 28 the set variable holding unit 34 having a predetermined set variable and to cause the second set variable signal 36 of a predetermined set variable to be inputted to the electromagnetic load controller 43 thereby to guarantee the minimum required driving of the electromagnetic load 46.

Figure 5:
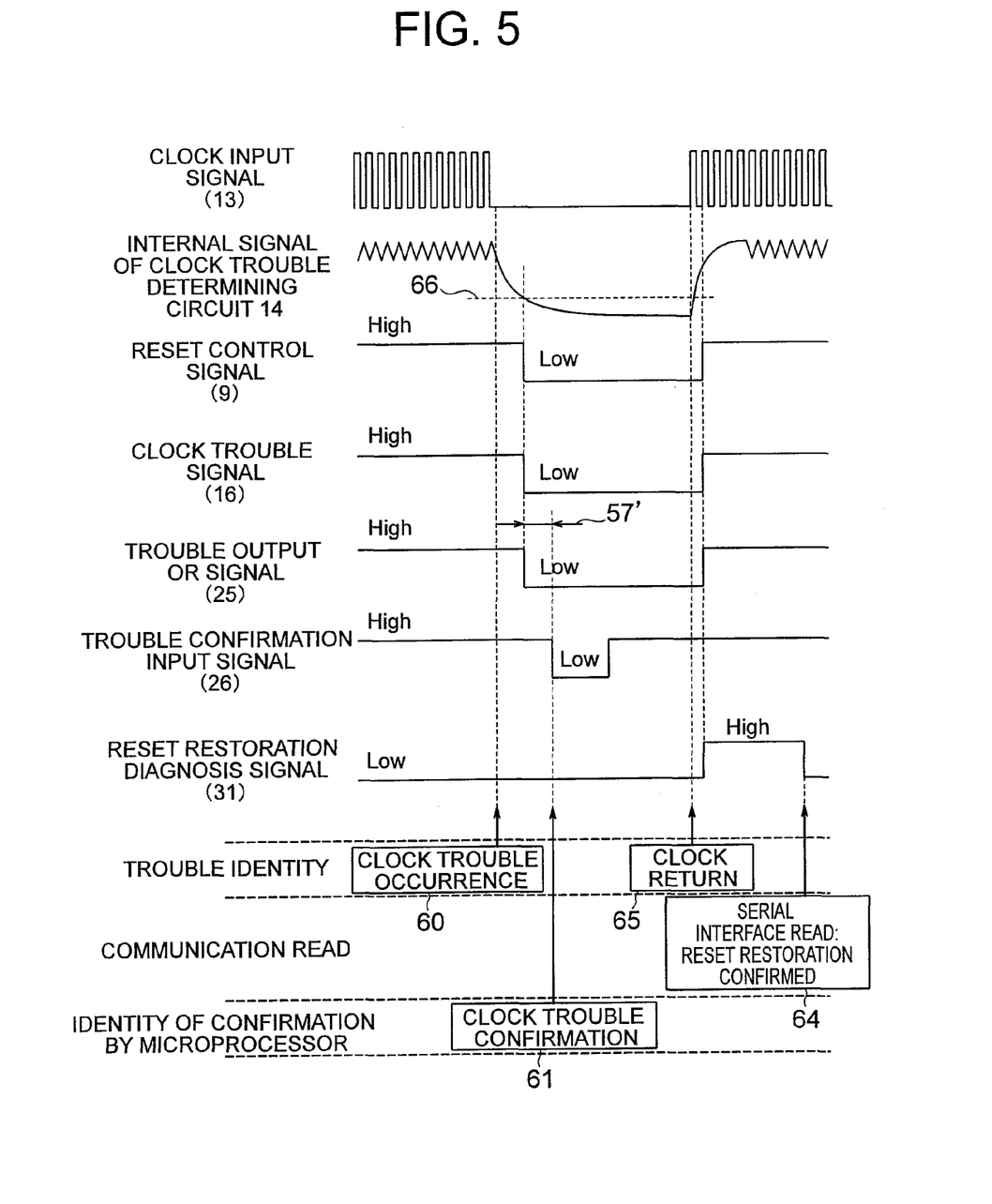
FIG. 5 is a timing chart of signal waveforms in different parts shown to illustrate one example of processing in the event of clock input trouble in an oscillator circuit provided in the internal combustion engine controller shown in FIG. 3.

FIG. 5 is a timing chart of signal waveforms in different parts shown to illustrate one example of processing in the event of the clock input trouble 10 in the oscillator circuit 11 provided in the internal combustion engine controller 1A.

In this internal combustion engine controller 1A, in the event of the clock trouble occurrence 60, for instance, in which the clock input signal 13 is fixed to the low side for some reason or other, parts lower than a clock trouble detection low threshold 66 will emerge in the waveforms of internal signals in the clock trouble determining circuit 14.

If the waveforms of internal signals in the clock trouble determining circuit 14 fall below the clock trouble detection low threshold 66 as described above, the clock trouble determination signal 15 outputted from the clock trouble determining circuit 14 will be switched over from the high state to the low state and sent out to the reset determining circuit 8. With respect to this clock trouble determination signal 15, the reset determining circuit 8 outputs the reset control signal 9 obtained by the logical summing of the reset signal 4 from the microprocessor 3A and the low voltage detection signal 7 resulting from the determination of the reference supply voltage 55 by the low voltage detection circuit 6. Whereas the reset control signal 9 in this case has been switched over from the high state to the low state, the clock trouble signal 16 outputted from the clock trouble determining circuit 14 and the trouble output OR signal 25 outputted from the OR circuit 17A will be in the form of having been switched over from the high state to the low state at the same timing.

By this reset control signal 9, various driving circuits including the DC/DC converter driving circuit 37, the electromagnetic load controller 43 and the serial interface circuit 21 are reset and stopped. This shift to the reset state can be automatically achieved without requiring the microprocessor 3A to issue any special reset signal, and it means that secondary trouble such as heating or ignition of the internal combustion engine can be prevented from being induced.

Meanwhile, the trouble confirmation input signal 26 outputted from the microprocessor 3A, to which the trouble output OR signal 25 has been inputted, to the serial interface trouble determining circuit 22 in a form in which switching-over from the high state to the low state, having fallen at the timing of the clock trouble confirmation 61 delayed by an equivalent of a trouble confirmation delay time 57' from the fall of the reset control signal 9, the clock trouble signal 16 and the trouble output OR signal 25 mentioned above, has taken place.

After that, when the clock input signal 13 takes on a state of clock return 65 back from the clock input trouble 10, the reset state is automatically cancelled without requiring the microprocessor 3A to issue any special release from the reset signal, the restoration diagnosis signal 31 is outputted by the reset restoration diagnosing circuit 30 in the form of having been switched over from the low state to the high state to the serial interface circuit 21, and confirmation of reset cancellation is communicated by the serial interface output signal 18 from the serial interface circuit 21 to the microprocessor 3A in the form of having switched over the restoration diagnosis signal 31 from the high state to the low state in the state of the serial interface read 64. Accordingly, the data processing load on the microprocessor 3A can be alleviated.

In this internal combustion engine controller 1A, the clock trouble signal 16 outputted from the clock trouble determining circuit 14 is outputted as the trouble output OR signal 25 to the microprocessor 3A via the OR circuit 17A. When the trouble output OR signal 25 has been switched over from the high state to the low state, the microprocessor 3A switches over trouble confirmation input signal 26 from the high state to the low state and causes it to be inputted to the serial interface trouble determining circuit 22.

If then the serial interface input trouble 20 occurs, the trouble output OR signal 25 outputted from the OR circuit 17A can be switched over from the low state to the high state by switching over the serial interface trouble signal 23 from the low state the high state according to the set variable switching signal 28 generated by the fall detecting circuit 27 having detected the fall of the trouble confirmation input signal 26, but if the clock input signal 13 is fixed to the low state as mentioned above, which means that driving circuits are in a state of being reset by the reset control signal 9, the trouble output OR signal 25 cannot be switched over from the low state to the high state, and the trouble output OR signal 25 will remain in the low state. By having the microprocessor 3A detect this state, the clock input trouble 10 in the clock input signal 13 can be confirmed.

Meanwhile, if the clock input signal 13 fixed in the low state returns to normalcy from the clock input trouble 10 and internal signals in the clock trouble determining circuit 14 rise above the clock trouble detection low threshold 66, the reset control signal 9 and the trouble output OR signal 25 are automatically switched over from the low state to the high state, and each driving circuit resumes normal operation. Further, the reset restoration diagnosing circuit 30 switches over the flag of the restoration diagnosis signal 31 having detected the rise of the reset control signal 9 from the low state to the high state, enabling the restoration from reset (reset cancellation) to be outputted to the microprocessor 3A via the serial interface circuit 21.

Figure 6:
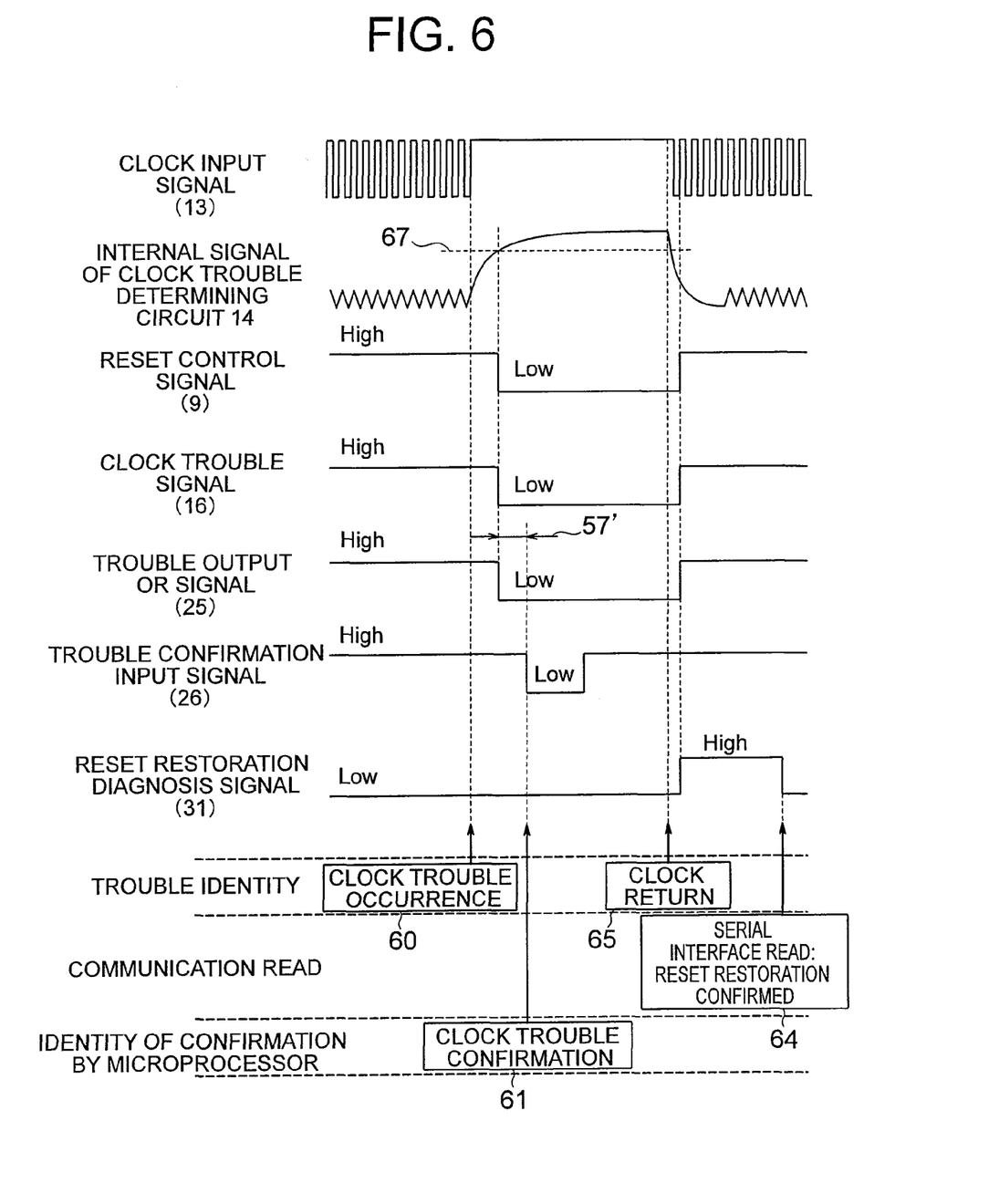
FIG. 6 is a timing chart of signal waveforms in different parts shown to illustrate another example of processing in the event of clock input trouble in the oscillator circuit provided in the internal combustion engine controller shown in FIG. 3.

FIG. 6 is a timing chart of signal waveforms in different parts shown to illustrate another example of processing in the event of occurrence of the clock input trouble 10 in the oscillator circuit 11 provided in the internal combustion engine controller 1A.

In this internal combustion engine controller 1A, in the event of the clock trouble occurrence 60, for instance, in which the clock input signal 13 is fixed to the high side for some reason or other, parts higher than a clock trouble detection high threshold 67 will emerge in the waveforms of internal signals in the clock trouble determining circuit 14.

If the waveforms of internal signals in the clock trouble determining circuit 14 rise above the clock trouble detection high threshold 67 as described above, the clock trouble determination signal 15 outputted from the clock trouble determining circuit 14 will be switched over from the high state to the low state and sent out to the reset determining circuit 8. As the subsequent operation processing and the functions used therein are similar to what was described with reference to FIG. 5, their description will be dispensed with.

Exemplary Embodiment 3

Figure 7:
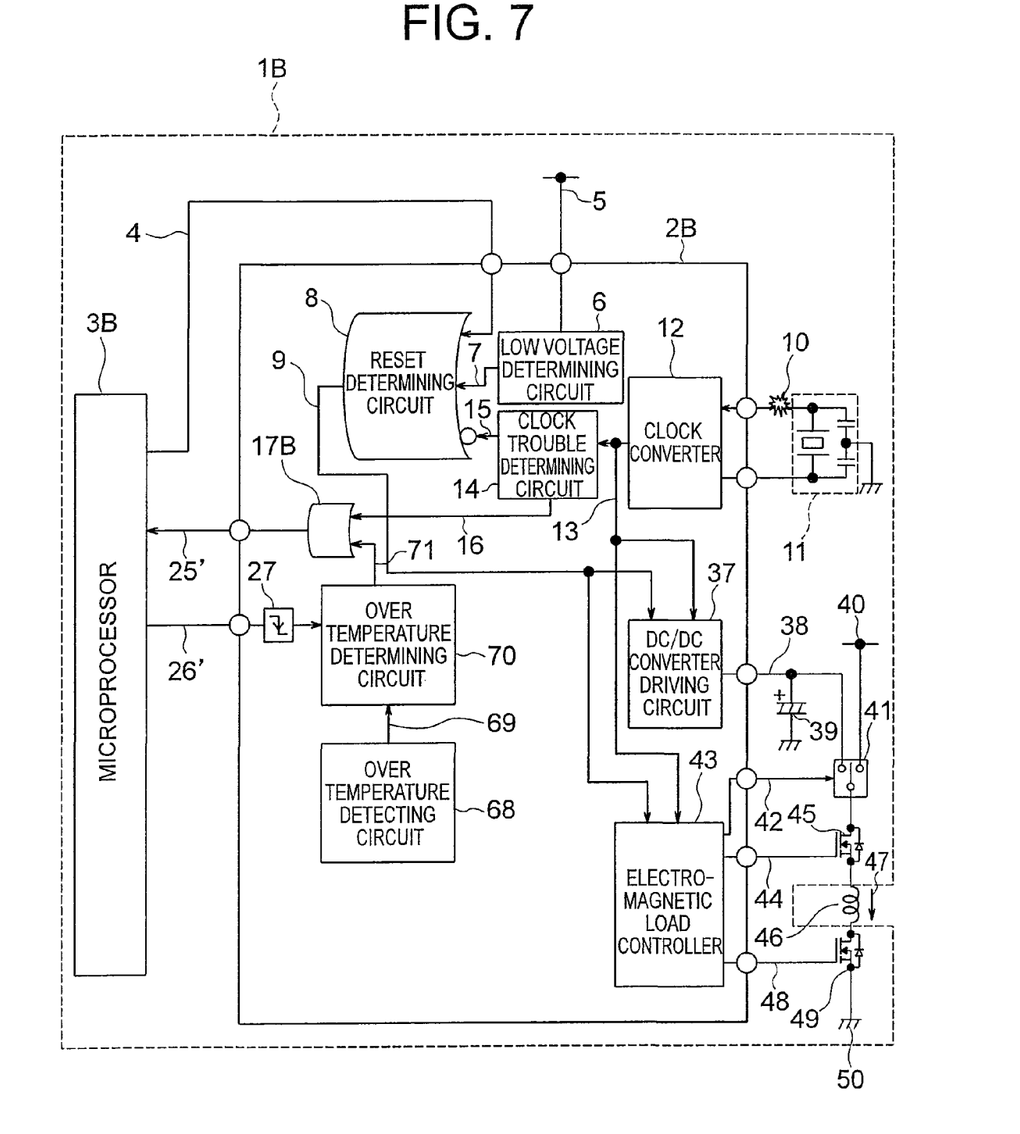
FIG. 7 is a circuit diagram illustrating the basic configuration of an internal combustion engine controller, which is Exemplary Embodiment 3 of the invention.

FIG. 7 is a circuit diagram illustrating the basic configuration of an internal combustion engine controller 1B, which is Exemplary Embodiment 3 of the invention.

This internal combustion engine controller 1B differs in configuration from the internal combustion engine controller 1A of Exemplary Embodiment 2 in that an over temperature detecting circuit 68 for detecting any over temperature of the internal combustion engine controller 1B and an over temperature determining circuit 70 for outputting an over temperature determination signal 71 indicating the result of over temperature determination based on the detected value of an over temperature detection signal 69 outputted from the over temperature detecting circuit are provided in an integrated circuit 2B in place of the serial interface circuit 21 of the integrated circuit 2A, trouble diagnosing functions pertaining thereto and return from reset diagnosing function, which are deleted here; the trouble/abnormality confirmation input signal 26' is inputted from a microprocessor 3B to the over temperature determining circuit 70 in the integrated circuit 2B; and the integrated circuit 2B outputs to the microprocessor 3B the trouble/abnormality output OR signal 25' resulting from the logical summing by an OR circuit 17B to which the clock trouble signal 16 and the over temperature determination signal 71 from the over temperature determining circuit 70 are inputted and which subjects these signals to logical summing.

In this internal combustion engine controller 1B, the over temperature detection signal 69 indicating the result of detection of any temperature abnormality in the device by the over temperature detecting circuit 68 is outputted to the over temperature determining circuit 70, and the over temperature determining circuit 70 outputs to the OR circuit 17B the over temperature determination signal 71 indicating the result of over temperature determination as to whether or not the detected temperature surpasses a prescribed threshold based on the over temperature detection signal 69.

To this OR circuit 17B, the clock trouble signal 16 from the clock trouble determining circuit 14 is also inputted, but if no clock input trouble 10 is occurring here, the clock trouble signal 16 will be inputted in the high state to the OR circuit 17B and, irrespective of what the over temperature determination signal 71 indicates, the trouble/abnormality output OR signal 25' is in the high state initially.

When the trouble/abnormality output OR signal 25' outputted from the OR circuit 17B to which the over temperature determination signal 71 in the low state indicating a state of over temperature has been switched over from the high state to the low state, the microprocessor 3B switches over the trouble/abnormality confirmation input signal 26' from the high state to the low state and causes it to be inputted to the over temperature determining circuit 70.

Since in the over temperature determining circuit 70 then, switching-over of the over temperature determination signal 71 from the low state to the high state at the timing of detection of the fall of the trouble/abnormality confirmation input signal 26' by the fall detecting circuit 27 causes the trouble/abnormality output OR signal 25' outputted from the OR circuit 17B to be switched over from the low state to the high state, the microprocessor 3B is enabled to confirm the over temperature state of the device.

To add, the procedure (sequence) of operation processing in the event of occurrence of the clock input trouble 10 in the clock input signal 13 is similar to what was described with respect to Exemplary Embodiment 2.

In short, in this internal combustion engine controller 1B, the microprocessor 3B is provided with a protective function against over temperature by enabling the microprocessor 3B, when the over temperature determining circuit 70 has determined over temperature based on the result of detection of the internal temperature or the surface temperature of the device by the over temperature detecting circuit 68, to be informed of the fact of detection so that such trouble as heating or ignition in driving circuits or the device can be restrained.

Exemplary Embodiment 4

Figure 8:
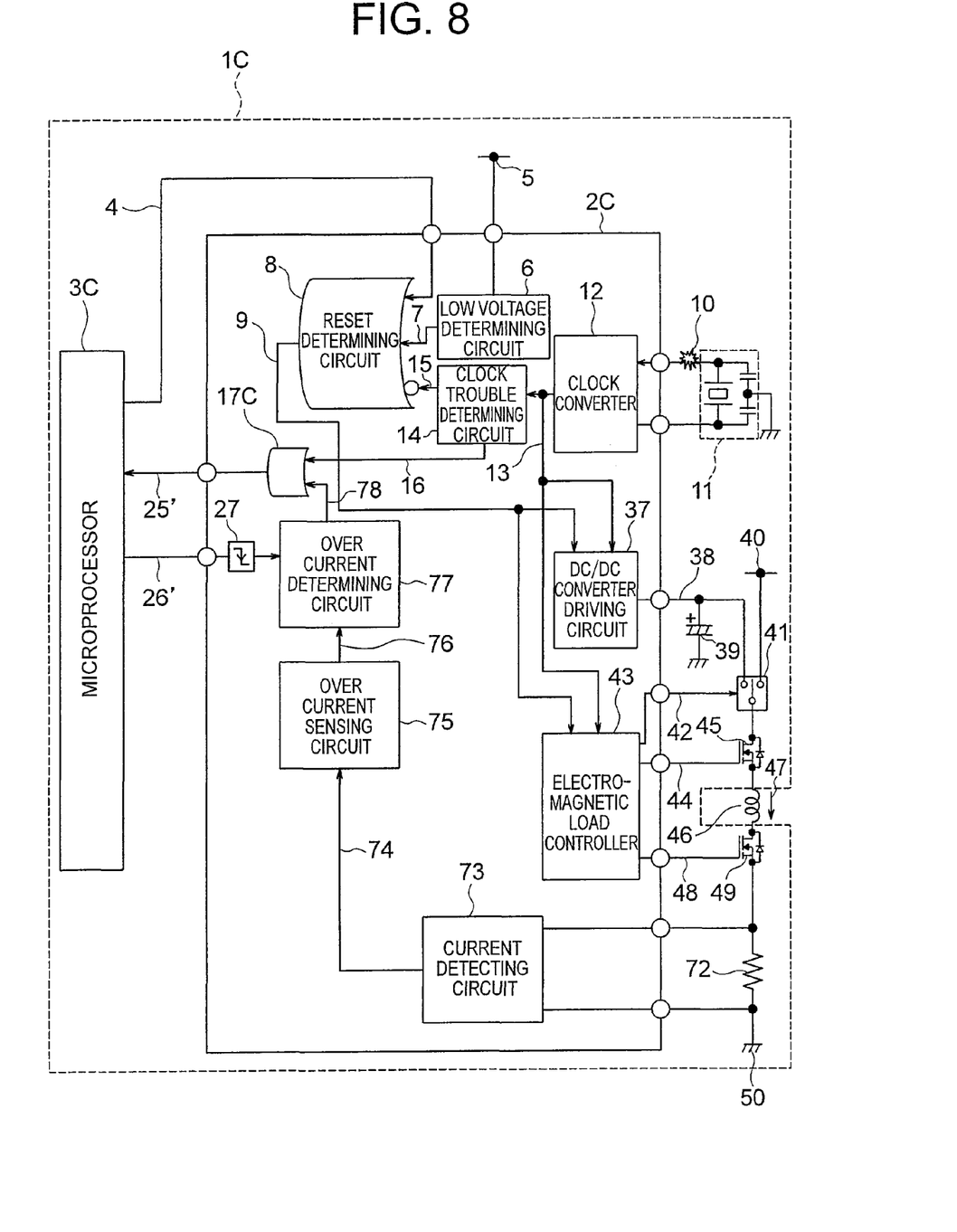
FIG. 8 is a circuit diagram illustrating the basic configuration of an internal combustion engine controller, which is Exemplary Embodiment 4 of the invention.

FIG. 8 is a circuit diagram illustrating the basic configuration of an internal combustion engine controller 10, which is Exemplary Embodiment 4 of the invention.

This internal combustion engine controller 10 differs in configuration from the internal combustion engine controller 1A of Exemplary Embodiment 2 in that, a configuration of disposing a current sensing resistor 72 between the low side driver 49 and the grounding voltage (GND) 50 in place of the serial interface circuit 21 of the integrated circuit 2A, trouble diagnosing functions pertaining thereto and return from reset diagnosing function, which are deleted here, a current sensing circuit 73 which, connected to the two ends of the current sensing resistor 72, sensing the current flowing through the current sensing resistor 72, an overcurrent sensing circuit 75 which senses any overcurrent based on the result of current sensing indicated by an current sensing signal 74 outputted from the current sensing circuit 73 and an overcurrent determining circuit 77 which outputs an overcurrent determination signal 78 indicating the result of overcurrent determination based on the detected value of an overcurrent sensing signal 76 outputted from the overcurrent sensing circuit 75 are provided in integrated circuit 2C; the trouble/abnormality confirmation input signal 26' is inputted from a microprocessor 3C to the overcurrent determining circuit 77 in the integrated circuit 2C; and the integrated circuit 2C outputs to the microprocessor 3C the trouble/abnormality output OR signal 25' resulting from the logical summing by an OR circuit 17C to which the clock trouble signal 16 and the overcurrent determination signal 78 from the overcurrent determining circuit 77 are inputted and which subjects these signals to logical summing. Incidentally, the current sensing resistor 72 here may as well be disposed between a battery source voltage 50 and the high side driver 45.

In this internal combustion engine controller 10, the overcurrent sensing signal 76 indicating the result of detection any current abnormality within the integrated circuit 2C by the overcurrent sensing circuit 75 is outputted to the overcurrent determining circuit 77, and the overcurrent determining circuit 77 outputs to the OR circuit 17C the overcurrent determination signal 78 indicating the result of overcurrent as to whether or not the detected temperature surpasses a prescribed threshold based on the overcurrent sensing signal 76.

To this OR circuit 17C, the clock trouble signal 16 from the clock trouble determining circuit 14 is also inputted, but if no clock input trouble 10 is occurring here, the clock trouble signal 16 will be inputted in the high state to the OR circuit 17C and, irrespective of what the overcurrent determination signal 78 indicates, the trouble/abnormality output OR signal 25' is in the high state initially.

When the trouble/abnormality output OR signal 25' outputted from the OR circuit 17C to which overcurrent determination signal 78 in the low state indicating a state of overcurrent has been switched over from the high state to the low state, the microprocessor 3C switches over the trouble/abnormality confirmation input signal 26' from the high state to the low state and causes it to be inputted to the overcurrent determining circuit 77.

Since in the overcurrent determining circuit 77 then, switching-over of the overcurrent determination signal 78 from the low state to the high state at the timing of detection of the fall of the trouble/abnormality confirmation input signal 26' by the fall detecting circuit 27 causes the trouble/abnormality output OR signal 25' outputted from the OR circuit 17C to be switched over from the low state to the high state, the microprocessor 3C is enabled to confirm the overcurrent state of the device.

To add, the procedure (sequence) of operation processing in the event of occurrence of the clock input trouble 10 in the clock input signal 13 is similar to what was described with respect to Exemplary Embodiment 2.

In short, in this internal combustion engine controller 10, the microprocessor 3C is provided with a protective function against overcurrent by enabling the microprocessor 3C, when the overcurrent determining circuit 77 has determined overcurrent based on the result of detection of a current substantially equivalent to the current flowing through the electromagnetic load 46 to what is detected when the overcurrent sensing circuit 75 detects the current flowing through the current sensing resistor 72, to be informed of the fact of detection so that such trouble as heating or ignition in driving circuits or the device can be restrained.

To add, functional information on the microprocessors 3 and 3A through 3C, the abnormality diagnosing circuit 54, the serial interface trouble determining circuit 22 as a communication trouble diagnosing circuit, the over temperature determining circuit 70, the overcurrent determining circuit 77, the clock trouble determining circuit 14 as a clock trouble diagnosing circuit, the trouble/abnormality signal output circuit 53 or the OR circuit 17A through 17C as multi-type trouble output circuits, the serial interface circuit 21, and the reset restoration diagnosing circuit 30 or functional information on the integrated circuits 2A through 2C in the internal combustion engine controller 1, 1A through 1C pertaining to the exemplary embodiments described above can as well be architected separately as a program for internal combustion engine controllers executable by a CPU not shown (it has to be noted that the CPU in this context may be deemed to mean what is functionally synonymous to the microprocessors 3 and 3A through 3C and separately altered in operational function). Also, functions pertaining to such a program for internal combustion engine controllers can be architected as an external circuit configuration. Therefore, the internal combustion engine controller according to the invention is not confined to the techniques disclosed with reference to the foregoing exemplary embodiments.

What is claimed is:

1. An internal combustion engine controller comprising:
an electromagnetic load controller disposed between a battery source voltage and a grounding voltage;
an electromagnetic load driven by the electromagnetic load controller, a microprocessor for outputting a control signal for controlling the driving of the electromagnetic load by the electromagnetic load controller;
a clock input signal generating circuit for generating a clock input signal for use in working the electromagnetic load controller;
an abnormality diagnosing circuit for diagnosing any physical abnormality with respect to the electromagnetic load controller and the electromagnetic load;
a clock trouble diagnosing circuit for diagnosing any clock input trouble of the clock input signal outputted from the clock input signal generating circuit, and
a trouble/abnormality signal output circuit using a logic circuit to which an abnormality diagnosis signal outputted from the abnormality diagnosing circuit and a clock trouble diagnosis signal outputted from the clock trouble diagnosing circuit are inputted in parallel and which outputs one line of trouble/abnormality output signals resulting from the logical summing of the inputted signals,
wherein, the microprocessor, according to a variation in the status level of the trouble/abnormality output signals inputted from the trouble/abnormality signal output circuit, outputs a trouble/abnormality confirmation input signal to the pertinent trouble/abnormality signals output circuit, and makes definite any of an abnormal state, a clock trouble state and a normal state based on the result of switching control of the status level of the pertinent trouble/abnormality output signals.

2. The internal combustion engine controller according to claim 1, wherein the abnormality diagnosing circuit is an over temperature diagnosing circuit which diagnoses over temperature, or an overcurrent diagnosing circuit which diagnoses overcurrent, as the physical abnormality.

3. The internal combustion engine controller according to claim 1, further comprising:
   a communication circuit which communicates to and from the microprocessor trouble diagnosis information regarding the electromagnetic load or the value of a set variable regarding the electromagnetic load,
   wherein the abnormality diagnosing circuit is a communication trouble diagnosing circuit which diagnoses any communication trouble between the communication circuit and the microprocessor;
   wherein the trouble/abnormality signal output circuit is a multi-type trouble output circuit to which a communication trouble diagnosis signal outputted from the communication trouble diagnosing circuit and the clock trouble diagnosis signal outputted from the clock trouble diagnosing circuit are inputted in parallel and which outputs one line of trouble output signals resulting from the logical summing of the inputted signals, and
   wherein the microprocessor, according to a variation in the status level of the trouble output signals inputted from the multi-type trouble output circuit, outputs a trouble confirmation input signal to the pertinent multi-type troubles output circuit, and makes definite any of an abnormal state, a clock trouble state and a normal state based on the result of switching control of the status level of the pertinent trouble output signal.

4. The internal combustion engine controller according to claim 3, wherein the communication trouble diagnosing circuit, if the number of bits of the communication input signal transmitted from the microprocessor to the communication circuit is not normal, outputs a diagnostic finding as the communication trouble to the pertinent microprocessor via the pertinent communication circuit.

5. The internal combustion engine controller according to claim 3, wherein the communication trouble diagnosing circuit, when the communication trouble is made definite by the microprocessor, switches over a set variable set in the communication circuit to the initial value thereof.

6. The internal combustion engine controller according to claim 3, wherein, when diagnosing that the clock trouble has occurred in the clock input signal outputted from the clock input signal generating circuit, the clock trouble diagnosing circuit outputs a reset control signal to reset the actions of the electromagnetic load controller and the communication circuit.

7. The internal combustion engine controller according to claim 6, wherein, when diagnosing that, after the actions of the electromagnetic load controller and the communication circuit have been reset by the outputting of the reset control signal, the clock trouble in the clock input signal has been eliminated and normalcy has returned, the clock trouble diagnosing circuit automatically cancels the pertinent resetting and stops outputting the pertinent reset control signal.

8. The internal combustion engine controller according to claim 7, further comprising:
   a reset restoration diagnosing circuit which inputs the reset control signal and diagnoses whether or not restoration from the resetting has been achieved and if restoration from the pertinent resetting has been found achieved, outputs a reset restoration diagnosis signal to the communication circuit to restore the action of the pertinent communication circuit.

9. The internal combustion engine controller according to claim 1, wherein at least the electromagnetic load controller, the abnormality diagnosing circuit, the clock trouble diagnosing circuit, the communication trouble diagnosing circuit, the trouble/abnormality signal output circuit or the multi-type trouble output circuit, the communication circuit, and the reset restoration diagnosing circuit are configured as an integrated circuit.

10. A product of a computer-readable program which has functional information on the microprocessor, the abnormality diagnosing circuit, the clock trouble diagnosing circuit, the communication trouble diagnosing circuit, the trouble/abnormality signal output circuit or the multi-type trouble output circuit, the communication circuit, and the reset restoration diagnosing circuit in the internal combustion engine controller according to claim 1 or functional information on the integrated circuit, and is executable by a CPU.

11. The internal combustion engine controller according to claim 1, wherein functions regarding the microprocessor, the abnormality diagnosing circuit, the clock trouble diagnosing circuit, the communication trouble diagnosing circuit, the trouble/abnormality signal output circuit or the multi-type trouble output circuit, the communication circuit, and the reset restoration diagnosing circuit or the functions of the integrated circuit are configured of an external circuit.

* * * * *